United States Patent
Chang

(10) Patent No.: US 10,067,407 B2
(45) Date of Patent: Sep. 4, 2018

(54) METHOD FOR AUTOMATICALLY FOCUSING ON SPECIFIC MOVABLE OBJECT, PHOTOGRAPHIC APPARATUS INCLUDING AUTOMATIC FOCUS FUNCTION, AND COMPUTER READABLE STORAGE MEDIUM FOR STORING AUTOMATIC FOCUS FUNCTION PROGRAM

(71) Applicant: PixArt Imaging Inc., Hsin-Chu (TW)

(72) Inventor: Yen-Min Chang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 253 days.

(21) Appl. No.: 13/737,920

(22) Filed: Jan. 9, 2013

(65) Prior Publication Data

US 2014/0139723 A1    May 22, 2014

(30) Foreign Application Priority Data

Nov. 22, 2012    (TW) .............................. 101143673 A

(51) Int. Cl.
*H04N 5/232* (2006.01)
*G03B 13/36* (2006.01)
*G02B 7/28* (2006.01)

(52) U.S. Cl.
CPC ......... *G03B 13/36* (2013.01); *H04N 5/23212* (2013.01); *G02B 7/28* (2013.01)

(58) Field of Classification Search
CPC .................................................. H04N 5/23219
USPC ................................ 348/349, 222.1; 396/153
See application file for complete search history.

(56) References Cited

U.S. PATENT DOCUMENTS

| 5,677,733 | A | * | 10/1997 | Yoshimura | ........... H04N 5/2351 348/169 |
|---|---|---|---|---|---|
| 5,689,241 | A | * | 11/1997 | Clarke et al. | ................. 340/575 |
| 6,714,665 | B1 | * | 3/2004 | Hanna et al. | ................. 382/117 |
| 6,975,346 | B2 | * | 12/2005 | Kumhyr | ............. G06K 9/00288 348/143 |
| 7,885,531 | B2 | * | 2/2011 | Kim et al. | .................... 396/153 |
| 2004/0001142 | A1 | | 1/2004 | Kumhyr | |
| 2006/0274114 | A1 | * | 12/2006 | Silverbrook | ......... B41J 2/14427 347/43 |
| 2008/0193115 | A1 | | 8/2008 | Uenishi | |
| 2009/0141141 | A1 | * | 6/2009 | Onozawa | .................... 348/222.1 |
| 2009/0237554 | A1 | * | 9/2009 | Kanayama | ......... H04N 5/23212 348/352 |

FOREIGN PATENT DOCUMENTS

| CN | 101241222 A | 8/2008 |
|---|---|---|
| CN | 101359151 A | 2/2009 |

* cited by examiner

*Primary Examiner* — Joel Fosselman
(74) *Attorney, Agent, or Firm* — Hauptman Ham, LLP

(57) ABSTRACT

A method capable of performing an automatic focus function upon a specific movable object in a real-time manner, the method being applicable to a photographic apparatus with the automatic focus function, includes: capturing real-time image within a field of view (FOV) of a lens; comparing images of a plurality of image areas of the real-time image with a feature image of the specific movable object to identify an image area corresponding to the feature image of the specific movable object; and, performing automatic focus on the identified image area.

7 Claims, 4 Drawing Sheets

METHOD FOR AUTOMATICALLY FOCUSING ON SPECIFIC MOVABLE OBJECT, PHOTOGRAPHIC APPARATUS INCLUDING AUTOMATIC FOCUS FUNCTION, AND COMPUTER READABLE STORAGE MEDIUM FOR STORING AUTOMATIC FOCUS FUNCTION PROGRAM

BACKGROUND OF THE INVENTION

1. Field of the Invention

The disclosed embodiments of the present invention relate to a photographic mechanism, and more particularly, to a method for automatically focusing on a specific movable object, related photographic apparatus, and related computer readable storage medium.

2. Description of the Prior Art

The existing photographic technology is capable of performing the face detection or the smile detection upon people within the field of view of the lens. The existing technology, however, is only able to detect all the characters, and can not distinguish between the desired photographing target which is usually the main character and the background characters. In static photographing, users have plenty of time to fix the deviated focus manually to refocus on the desired target characters; however, in dynamic photographing, users do not have time to fix the deviated focus manually. Therefore, even if the existing photographic technique is able to detect all the faces in a filed of view, there is a great possibility that the actual focus is on the background characters instead of the desired main character, resulting in the captured picture that is out of focus and is unwanted to the users.

SUMMARY OF THE INVENTION

Therefore, one of the objectives of the present invention is to provide a method for automatically focusing on a specific movable object, related photographic apparatus, and related computer readable storage medium, to solve the above-mentioned issues.

According to a first aspect of the present invention, an exemplary method capable of performing automatic focus function upon a specific movable object in real time is disclosed. The exemplary method includes: capturing a real-time image within a field of view (FOV) of a lens; comparing images of a plurality of image areas of the real-time image with a feature image of the specific movable object to identify an image area corresponding to the feature image of the specific movable object; and performing automatic focus upon the identified image area.

According to a second aspect of the present invention, an exemplary photographic apparatus with the automatic focus function is disclosed. The exemplary photographic apparatus includes a lens and a processing circuit. The lens is arranged for capturing a real-time image within a field of view (FOV) of the lens. The processing circuit is electrically coupled to the lens, arranged for comparing images of a plurality of image areas of the real-time image with a feature image of the specific movable object to identify an image area corresponding to the feature image of the specific movable object, wherein the lens performing automatic focus upon the identified image area.

According to a third aspect of the present invention, an exemplary non-transitory computer-readable medium is disclosed. The exemplary non-transitory computer-readable medium coupled to an electronic apparatus has a circuit system, wherein the computer-readable medium, which is capable of performing automatic focus function upon a specific movable object in real time, includes at least a program code stored therein, and following steps are performed when the program code is read and executed: capturing a real-time image within a field of view (FOV) of a lens; comparing images of a plurality of image areas of the real-time image with a feature image of the specific movable object to identify an image area corresponding to the feature image of the specific movable object; and performing automatic focus upon the identified image area.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
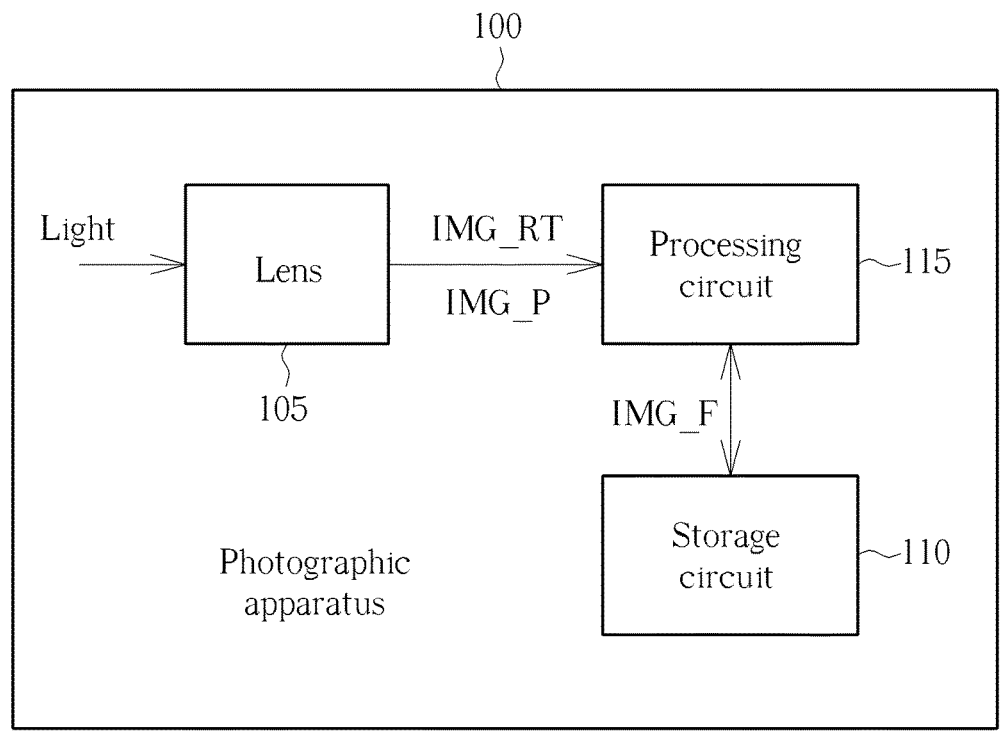
FIG. 1 is a block diagram illustrating a photographic apparatus with an automatic focus function according to a preferred embodiment of the present invention.

Please refer to FIG. 1, which is a block diagram illustrating a photographic apparatus 100 with an automatic focus function according to a preferred embodiment of the present invention. The photographic apparatus 100 includes a lens 105, a storage circuit 110, and a processing circuit 115. The lens 105 is used to capture a real-time image IMG_RT within the field of view range of the lens 105. In addition, before capturing the real-time image IMG_RT, the lens 105 captures at least one reference image IMG_P of a specific movable object (i.e., a target photographic object) in advance, and then outputs the real-time image IMG_RT 105 captured by the lens 105 as well as the pre-captured reference image IMG_P to the processing circuit 115. The processing circuit 115 is coupled to the lens 105, and used for processing the reference image IMG_P captured in advance to generate the feature image IMG_F of the specific movable object, and storing the feature image IMG_F in the storage circuit 110, where the storage circuit 110 is used to record the feature image IMG_F of the specific movable object into a database. After lens 105 captures the real-time image IMG_RT, the processing circuit 115 can compare images of a plurality of image areas of the real-time image IMG_RT with the feature image IMG_F of the specific movable object one by one according to the real-time image IMG_RT captured by the lens and the feature image IMG_F recorded in the database, thereby identifying the image area corresponding to the feature image IMG_F of the specific movable object from the plurality of image areas. After the image area is identified, the processing circuit 115 controls the lens 105 to focus on the identified image area, and therefore achieves the automatic focus function.

Figure 2A:
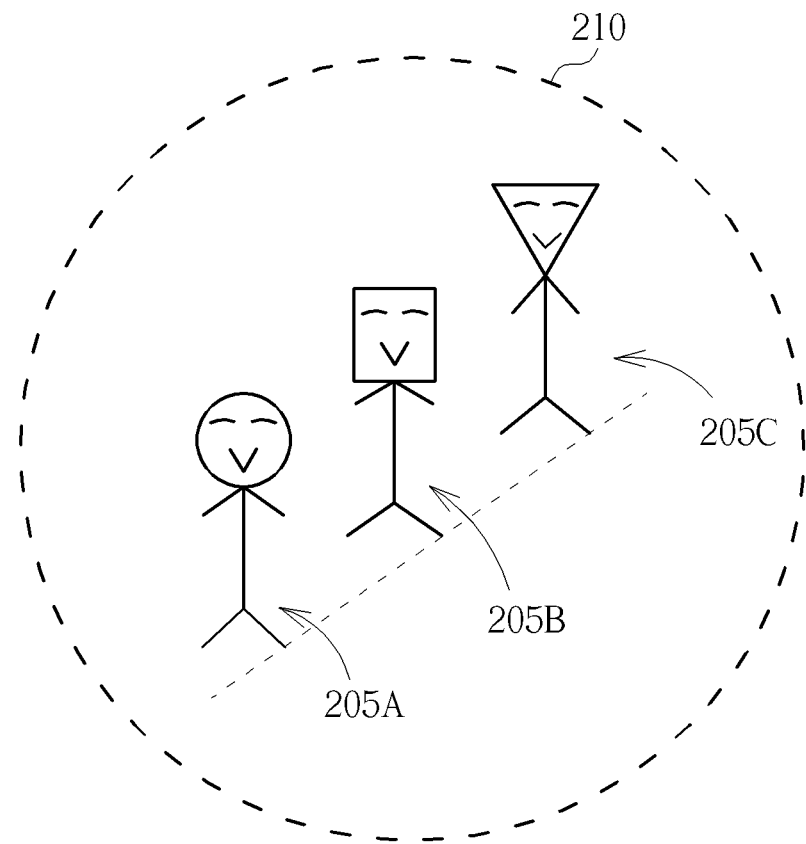
FIG. 2A is a diagram illustrating multiple real-time images captured within the field of view of the lens at different time points.
Figure 2B:
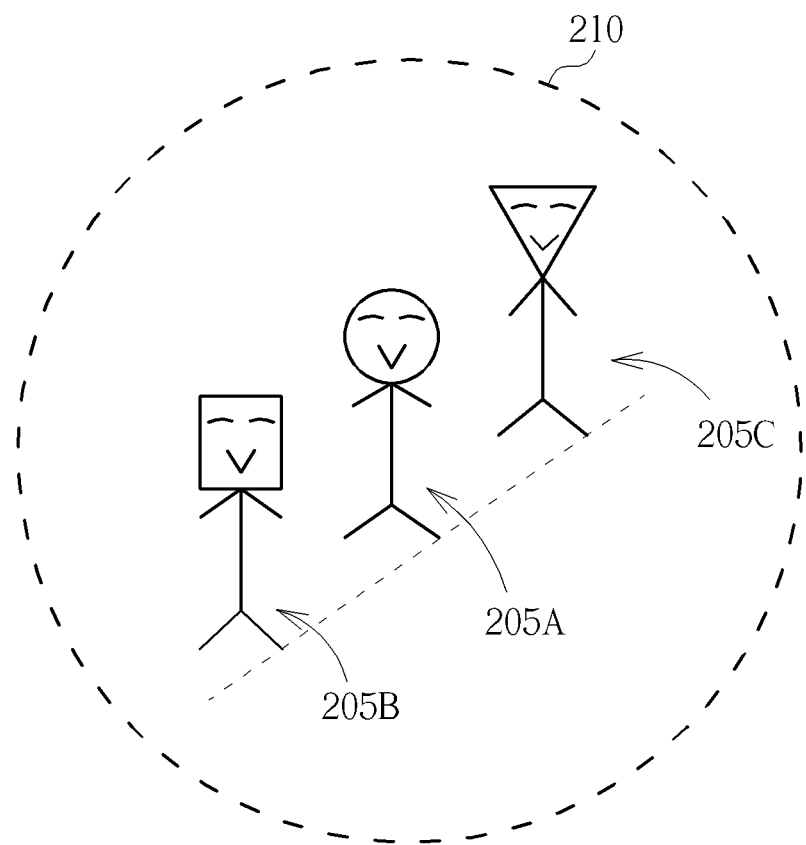
FIG. 2B is another diagram illustrating multiple real-time images captured within the field of view of the lens at different time points.

In this embodiment, the specific movable object may be a specific movable target object. For example, the target object may be a specific target person or target animal. When the lens 105 captures the real-time image IMG_RT for each time point according to a capture rate, if the target person or target animal moves, then the position where the target person or target animal is located within the field of view of the lens 105 may vary with time. For example, please refer to FIG. 2A and FIG. 2B. FIG. 2A and FIG. 2B are diagrams illustrating multiple real-time images IMG_RT captured within the field of view 210 of the lens 105 at different time points t0 and t1. As shown in FIG. 2A, reference numerals 205A-205C indicate images and locations of different characters which are arranged in the order of positions, wherein the reference numeral 205A represents an image of a target character, and the target character 205A has a behavior of moving along with the time. As a result, the target character and a character 205B interchange positions with each other. As shown in FIG. 2B, the target character 205A is now located between the character 205B and the character 205C. The photographic apparatus 100 in the present embodiment is capable of continuously focusing on the target character 205A automatically. At the time point t0, the photographic apparatus 100 is capable of focusing on the front position shown in FIG. 2A where the target character 205A is located, while at the time point t1, the photographic apparatus 100 is capable of focusing on the middle position shown in FIG. 2B where the target character 205A is located. No matter how the target character moves, the photographic apparatus 100 is able to identify the image position of the target character as long as the target character is still within the field of view of the lens 105. Also, the lens 105 would focus on the position of the image so that the user does not have to worry that the image may be out of focus, but simply presses a button (e.g., a physical button or a virtual button) at any moment he/she wants to photograph to obtain a high-quality image with accurate focus and without distortion. In addition, the automatic focus function mentioned above is also suitable for filming. When the user utilizes the photographic apparatus 100 to photograph the target character 205A, after the user presses the photographing button, the photographic apparatus 100 would identify the location of the target character and then the lens 105 would focus on it. Hence, the user does not need to be concerned about the out-of-focus issues while using the photographic apparatus 100.

The real-time image identification and automatic focus operation of the photographic apparatus 100 are described as follows. The lens 105 extracts the real-time image IMG_RT based on an appropriate frequency, wherein the content of a real-time image IMG_RT is like the image of the field of view shown in FIG. 2A or FIG. 2B. The captured real-time image IMG_RT is sent to the processing circuit 115, and the processing circuit 115 identifies the specific target character from the plurality of image objects within the real-time image IMG_RT. First of all, the processing circuit 115 analyzes the image objects within the real-time image IMG_RT to obtain the possible image position of the target character. Practically, the processing circuit 115 may use a face detection operation to obtain multiple image-area positions corresponding to multiple characters (which is regarded as multiple movable objects) respectively, followed by identifying the correct image position of the target character from the image-area positions. After the image-area position or area of the specific target character is identified, the processing circuit 115 may control the lens 105 to focus on the image-area of the identified target character to achieve the automatic focus function. For instance, as shown in FIG. 2A, by means of the face detection operation, the processing circuit 115 may obtain the analysis result showing that the real-time image includes the image-area positions of the plurality of characters 205A-205C, and then compares the images located in the above-mentioned image-area positions with the feature image IMG_F of the target character, respectively, to thereby identify that the correct image position of the target character is the image position of the image 205A. Therefore, the processing circuit 115 can control the lens 105 to focus on the identified target character image 205A, to achieve the effect of automatic focus. It should be noted that, the aforementioned specific movable object is not limited to the target character. In other embodiments, it may be a target animal, a moving target object (e.g., a vehicle such as a car) and so on. In other words, the automatic focus function of the photographic apparatus 100 of the present invention is applicable to photographing target characters, target animals, or moving target objects. Besides, face detection is utilized to analyze the possible image-area position of the characters in the real-time image IMG_RT in aforementioned embodiment. However, this is not a limitation of the present invention. In practice, other detection operations may be utilized in the analysis of the possible image-area position of the real-time image.

In addition, please note that the real-time image IMG_RT obtained by the lens 105 refers to the real-time image imaged on the capacitive coupling element array within the field of view of the lens 105 through reflection of light while the user operates the photographic apparatus 100. In other words, the real-time image IMG_RT obtained by the lens 105 refers to the image imaged on the photosensitive elements of the photographic apparatus 100 in a real time manner before the user presses the photographing button, and the real-time image IMG_RT would present different imaging results in response to the objects varying or moving within the field of view of the lens 105. That is, the real-time image IMG_RT refers to the image captured by the lens 105 instantly while the user is photographing formally. In addition, the pre-stored reference image IMG_P refers to the reference image obtained by capturing a specific character or a specific animal before the user photographs formally. The reference image IMG_P includes the feature of the specific target character or the specific animal, and is utilized to generate the feature image IMG_F of the specific moving object, where the feature (can be regarded as the feature image) would be referenced by the processing circuit 115 to perform automatic focus upon part of the real-time image IMG_RT.

In a practical operation, the photographic apparatus 100 allows the user to pre-photograph first before the formal photographing, thus creating an image database of the specific moving object. Next, the following steps would check whether the real-time image IMG_RT is the same as the feature image IMG_F resulting from the reference image of the image database, and identify whether the specific moving object exists on the photosensitive screen as well as the corresponding position. After the identification is done, the automatic focus operation is performed such that the focus would be directed to the image position of the specific movable object to achieve the automatic tracking and focusing effect. Regarding the pre-photographing process, the processing circuit 115 controls the lens 105 to pre-shoot at least one reference image IMG_P of the specific movable object. After that, the processing circuit 115 generates the feature images IMG_F according to the at least one reference image IMG_P, and records the feature image IMG_F of the specific movable object into the database through the storage circuit 110. It should be noted that, if there is only one pre-photographing reference image, the process of generating the feature image may directly utilize the image corresponding to the specific movable object of the reference image IMG_P (i.e., part of the image of the reference image) as the feature image IMG_F of the specific movable object. Conversely, if there is more than one pre-photographing reference image IMG_P, the process of generating the feature image IMG_F may utilize an image corresponding to the specific movable object within an average image derived from averaging the reference images IMG_P (i.e., part of the average image) as the feature image IMG_F of the specific movable object. Besides, any other processes of generating the feature image according to the reference image all obey the spirit of the present invention, and also belong to the scope of the present invention.

Besides, in a practical design where a target character is shot to obtain the feature image IMG_F, the pre-photographed feature image IMG_F may be physiological characteristics such as the target character's face or appearance, the shape of the facial features, skin color, hair, etc. Besides, in other embodiments, the feature image may be the characteristics of the target character's dressing, characteristics of the target character's accessories, or characteristics of the target character's belongings. For example, the color and style of the coat, the type and style of jewelry, portable packages, rain gears, and so on. By pre-photographing the feature image IMG_F of the target character, the processing circuit 115 can identify the accurate image position of the target character in a real time manner from a real-time image IMG_RT, which includes a number of characters. Therefore, this makes the photographic apparatus 100 applicable to capturing a specific target character or some specific target characters among a group of moving characters.

Figure 3:
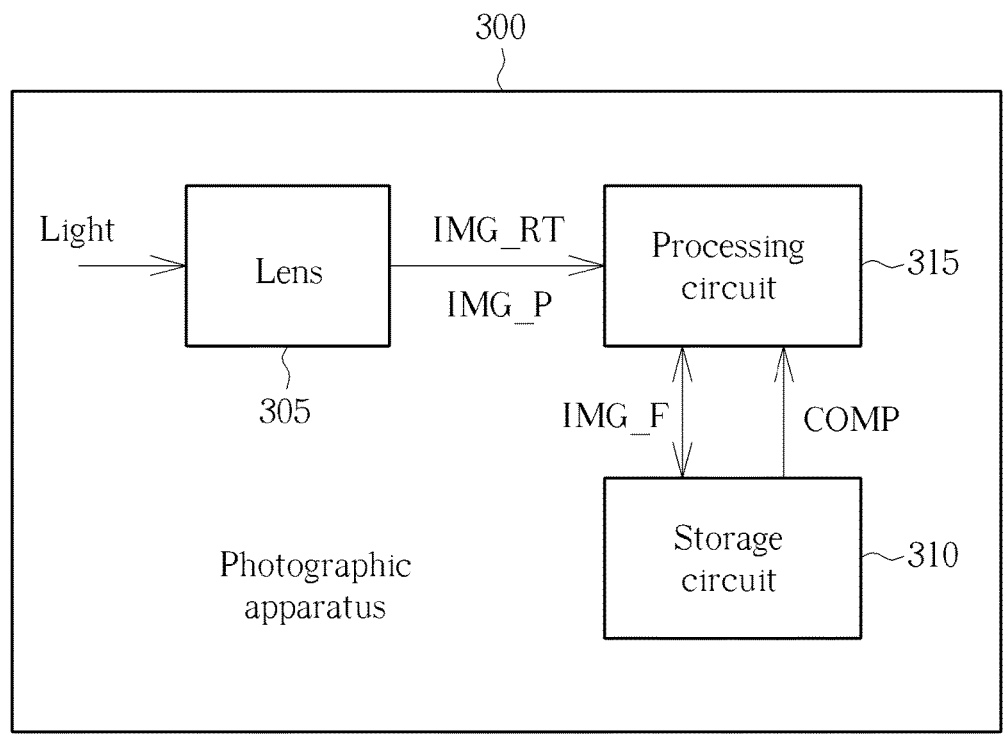
FIG. 3 is a block diagram illustrating a photographic apparatus with an automatic focus function according to another embodiment of the present invention.

Furthermore, in other embodiments, the operations performed by the aforementioned processing circuit 115 may be realized by a computer program code. Please refer to FIG. 3, which is a block diagram illustrating a photographic apparatus 300 with an automatic focus function according to another embodiment of the present invention. The photographic apparatus 300 includes a lens 305, a storage circuit 310, and a processor 315, wherein the storage circuit 310 is a computer-readable storage medium implemented by a memory element and having a computer program COMP stored therein. The processor 315 reads and executes the computer program stored in the storage circuit 310 to perform the step of automatically focusing on a specific movable object in a real-time manner. The steps include capturing the real-time image IMG_RT, comparing the real-time image IMG_RT with the feature image IMG_F to identify the specific movable target object, and performing automatic focus upon the identified image area to achieve the automatic tracking and focusing effect. As the aforementioned steps are similar to the operation steps of the photographic apparatus 100 shown in FIG. 1, the description is omitted here for brevity. Moreover, in other embodiments, the computer program COMP may be stored in an external memory element. When the photographic apparatus 300 boots up, the processor 315 reads the computer program COMP and stores it into the storage circuit 310 for subsequent use.

Based on the above descriptions, when a user uses the photographic apparatus 100/300 of the embodiment of the present invention, the target feature image IMG_F can be obtained by means of pre-photographing before the formal photographing is initiated, so the target identification can be done during the formal photographing. In this way, the photographic apparatus 100/300 can identify the specific target within the field of view of the lens 105/305, and then automatically focus on the target. Therefore, the user simply needs to press the photographing button to obtain properly focused images. In addition, while a target character is being photographed, the aforementioned target identification and automatic focusing function of the present invention may be combined with the function and operation of smile detection photographing. Hence, the focus is on the target character by using the aforementioned target identification and automatic focus function, and then an image is captured according to the smile detection photographing. In this way, the user can get the high-quality image of the target characters without pressing the photographing button. Furthermore, in the above-described embodiments, the photographic apparatus 100/300 may be disposed in a camera apparatus, a mobile communication device, or any handheld portable apparatus. These all belong to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing an automatic focus function upon a single specific movable target object in a real-time manner, the method being applicable to a photographic apparatus, which comprises a photographing button and a lens and has the automatic focus function, the method comprising:

photographing a reference image, before the photographing button is pressed, of the single specific movable target object through the lens to generate a feature image of the single specific movable target object;

storing the feature image of the single specific movable target object in a database;

capturing a real-time image within a field of view (FOV) of the lens;

comparing images of a plurality of image areas of the real-time image with the feature image of the single specific movable target object for identifying an image area corresponding to the feature image of the single specific movable target object and identifying, after the photographing button is pressed, a location of the single specific movable target object, wherein the feature image of the single specific movable target object is identified within the real-time image and corresponds to at least a portion of a dressing characteristic of a person, an accessory characteristic of a person, a non-physiological possession characteristic of a person, or an animal characteristic without including human characteristic; and performing automatic focus of the lens, after the photographing button is pressed, upon the identified location of the single specific movable target object.

2. The method of claim 1, wherein the images of the plurality of image areas comprise images corresponding to a plurality of movable objects, and said identifying the image area corresponding to the feature image of the single specific movable target object comprises:

identifying the feature image of the single specific movable target object from the images corresponding to the plurality of movable objects.

3. A photographic apparatus with an automatic focus function, comprising:

a photographing button;

a storage circuit configured to store images;

a lens configured to capture a real-time image within a field of view (FOV) of the lens; and a processing circuit electrically coupled to the lens, and configured to compare images of a plurality of image areas of the real-time image with a feature image of a single specific movable target object to identify an image area corresponding to the feature image of the single specific movable target object and identify, after the photographing button is pressed, a location of the single specific movable target object, wherein the feature image of the single specific movable target object is identified within the real-time image and corresponds to at least a portion of a dressing characteristic of a person, an accessory characteristic of a person, a non-physiological possession characteristic of a person, or an animal characteristic without including human characteristic;

wherein the lens is configured to capture a reference image, before the photographing button is pressed, of the single specific movable target object, and the processing circuit is configured to generate the feature image of the single specific movable target object to be stored in a database in the storage circuit, and a focus of the lens is focused on, after the photographing button is pressed, the identified location of the single specific movable target object through performing automatic focus.

4. The photographic apparatus of claim 3, being disposed on a mobile communication apparatus or a camera apparatus.

5. The photographic apparatus of claim 3, wherein the images of the plurality of image areas comprises images corresponding to a plurality of movable objects, and the processing circuit is configured to identify the feature image of the single specific movable target object from the images corresponding to the plurality of movable objects.

6. A non-transitory computer-readable medium, storing a computer program for performing an automatic focus function upon a single specific movable target object in a real-time manner, the computer program, when executed by a photographic apparatus, which comprises a photographing button and a lens and has the automatic focus function, causing the photographic apparatus to execute:

photographing a reference image, before the photographing button is pressed, of the single specific movable target object through the lens to generate a feature image of the single specific movable target object;

storing the feature image of the single specific movable target object in a database;

capturing a real-time image within a field of view (FOV) of the lens;

comparing images of a plurality of image areas of the real-time image with the feature image of the single specific movable target object for identifying an image area corresponding to the feature image of the single specific movable target object and identifying, after the photographing button is pressed, a location of the single specific movable target object, wherein the feature image of the single specific movable target object is identified within the real-time image and corresponds to at least a portion of a dressing characteristic of a person, an accessory characteristic of a person, a non-physiological possession characteristic of a person, or an animal characteristic without including human characteristic; and performing automatic focus of the lens, after the photographing button is pressed, upon the identified location of the single specific movable target object.

7. The computer-readable medium of claim 6, wherein the images of the plurality of image areas comprises images corresponding to a plurality of movable objects, and said identifying the image area corresponding to the feature image of the single specific movable target object comprises:

identifying the feature image of the single specific movable target object from the images corresponding to the plurality of movable objects.

* * * * *